United States Patent [19]

Watanabe

[11] Patent Number: 4,585,277
[45] Date of Patent: Apr. 29, 1986

[54] WIRE WHEEL WITH SPOKES HAVING CRANK SHAPED SECTION

[75] Inventor: Masae Watanabe, Iwata, Japan

[73] Assignee: Yamaha Hatsudoki Kabushiki Kaisha, Japan

[21] Appl. No.: 702,817

[22] Filed: Feb. 19, 1985

[30] Foreign Application Priority Data

Feb. 20, 1984 [JP] Japan .................................. 59-28685

[51] Int. Cl.⁴ ............................................. B60B 1/04
[52] U.S. Cl. ....................................... 301/56; 301/59; 301/104; 301/105 B
[58] Field of Search ..................................... 301/56–59, 301/74, 80, 104, 105 B

[56] References Cited

U.S. PATENT DOCUMENTS

| | | | |
|---|---|---|---|
| 1,043,283 | 11/1912 | Zarth | 301/56 |
| 1,050,506 | 1/1913 | Zarth | 301/56 |

FOREIGN PATENT DOCUMENTS

| | | | |
|---|---|---|---|
| 21385 | 7/1916 | Denmark | 301/56 |
| 457286 | 11/1936 | United Kingdom | 301/56 |

*Primary Examiner*—David A. Scherbel
*Attorney, Agent, or Firm*—Ernest A. Beutler

[57] ABSTRACT

A wire wheel construction consisting of a rim, a hub having a pair of spaced flanges and pairs of spokes that are fixed at their opposite ends to the rim and at an intermediate portion to a respective flange of the hub. The arrangement is such that the end connections of the spokes to the rim may be on the same side of the center line of the rim as the respective connecting flange of the hub.

9 Claims, 4 Drawing Figures

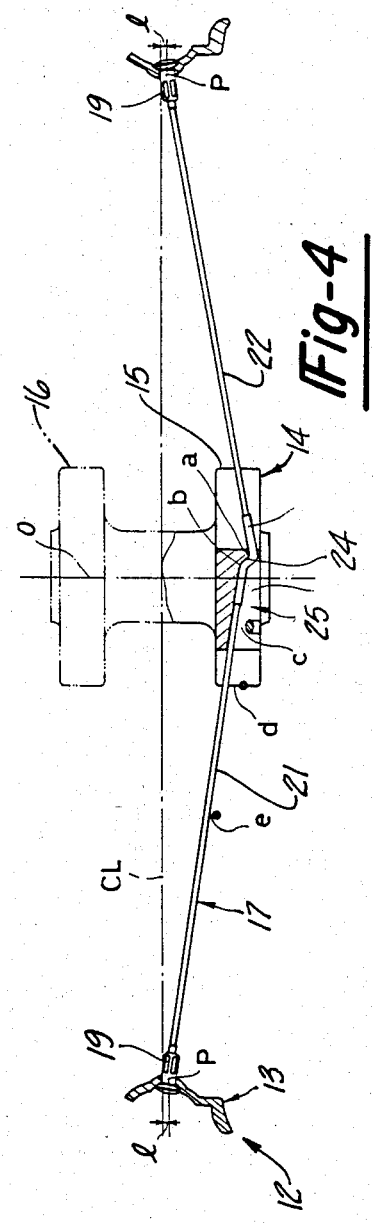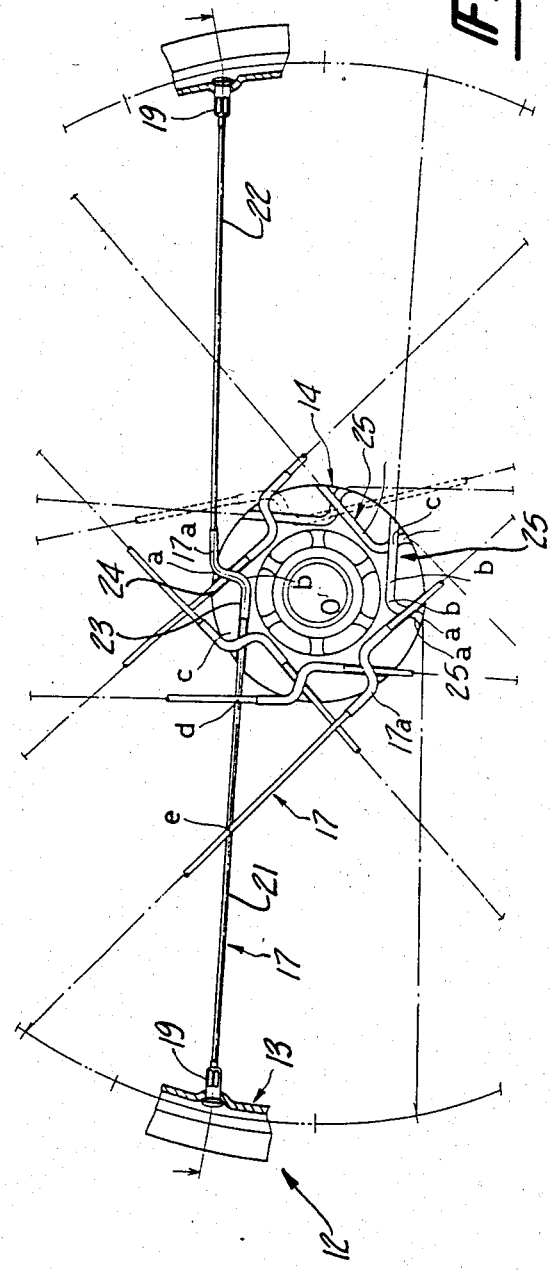

WIRE WHEEL WITH SPOKES HAVING CRANK SHAPED SECTION

BACKGROUND OF THE INVENTION

This invention relates to a wire wheel and more particularly to an improved spoke pattern for such a wheel that facilitates manufacture on existing equipment and which will provide a high strength and light weight.

Recently, the advantages of forming wire wheels with a plurality of single spokes that are connected at their opposite ends to the rim at circumferentially spaced locations and at an intermediate portion to the hub have shown considerable popularity. One reason for this is that there is less likelihood of the spokes becoming loosened and, if properly designed, the wheel may be more conveniently and easily manufactured. Normally, the intermediate portion is formed with an angled part that interlocks with a corresponding opening of the hub so as to secure this intermediate portion to the hub. In one type of wheel, as disclosed in my pending Japanese Patent Application Serial No. 58-165218, the intermediate portion has a crank shape in side elevation. L-shaped retaining grooves are formed in one side of the hub so as to retain the individual spokes to the hub.

Although this construction has numerous advantages, the spoke pattern has a tendency to cause the individual spokes to interfere with each other unless their connections to the rim are located at a position slightly over the center line of the rim. Conventionally, wire wheels are formed so that the spokes at each side of the hub are connected to the rim either on the center line of the rim or on the same side of the center line as the cooperating hub portion. Thus, a wheel made in accordance with the construction shown in my aforenoted Japanese patent application does not lend itself to manufacture on conventional wire wheel making machines. Those machines are not designed so as to form the spoke attachment holes of the rim on the opposite side of the rim center line. Thus, considerable modification is required with existing machinery to manufacture rims for wheels of this type. Alternatively, it would be possible to avoid this problem through a reduction of the number of spokes, but this obviously will reduce the strength of the wheel.

It is, therefore, a principal object of this invention to provide a wire wheel arrangement that permits a strong wheel and yet can be manufactured on conventional rim making equipment.

It is another object of the invention to provide an improved wire wheel having single spokes that extend from the rim across the hub to another attachment point on the rim and which can be conveniently and inexpensively manufactured.

SUMMARY OF THE INVENTION

This invention is adapted to be embodied in a wire wheel comprising a hub defining an axis of rotation, a rim and a plurality of spokes affixed to the rim and the hub for affixing the rim to the hub. The spokes have a first end that is affixed to the rim, a second end that is affixed to the rim at a point circumferentially spaced from the point of attachment of the first end and an intermediate portion having a crank shape in side elevation consisting of at least two bent sections connected by a straight section and affixed to the hub. The hub is formed with a plurality of recesses, each adapted to receive a respective spoke intermediate portion for fixing the spokes to the hub.

In accordance with one feature of the invention, the hub recess are formed so that the straight section of the intermediate portion is inclined so that its radially inwardmost bent portion is positioned closer to a central plane perpendicular to the axis of rotation and passing through the center of the rim than the radially outermost bent portion.

In accordance with another feature of the invention, each spoke intersects the next adjacent two spokes considered in a circumferential direction and viewed in side elevation. The intersection with the first most adjacent spoke has a greater axial spacing than the intersection with the second adjacent spoke.

BREIF DESCRIPTION OF THE DRAWINGS

FIG. 3 is a still further enlarged partial side elevational view of the wheel.

FIG. 4 is a cross-sectional view taken along the line 4—4 of FIG. 3.

DETAILED DESCRIPTION OF THE PREFERRED EMBODIMENT

Figure 1:
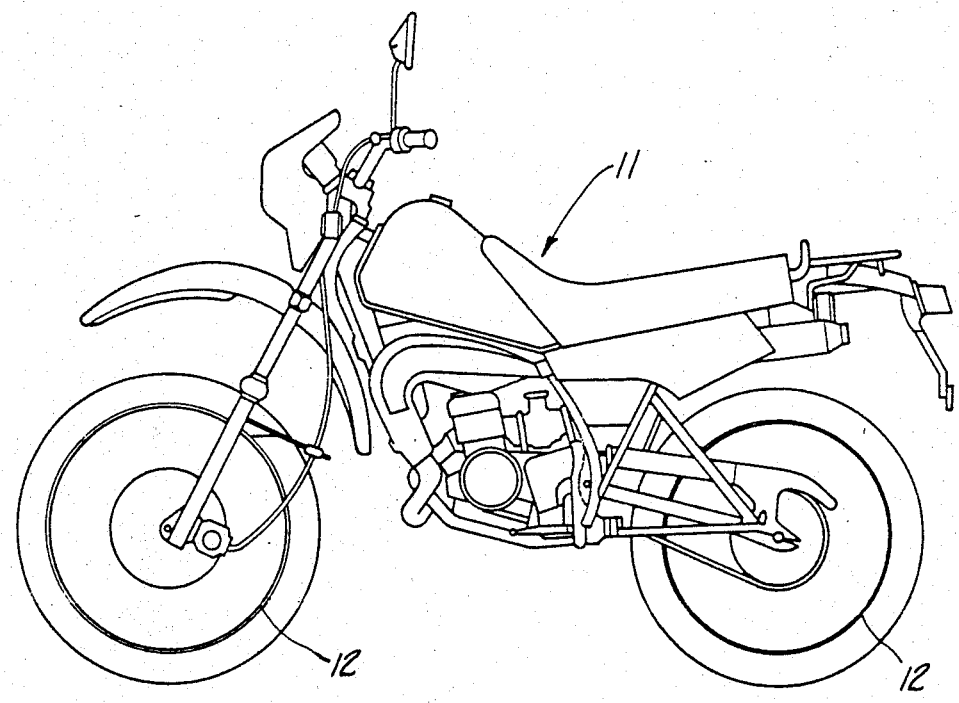
FIG. 1 is a side elevational view of a motorcycle embodying front and rear wheels constructed in accordance with an embodiment of the invention.
Figure 2:
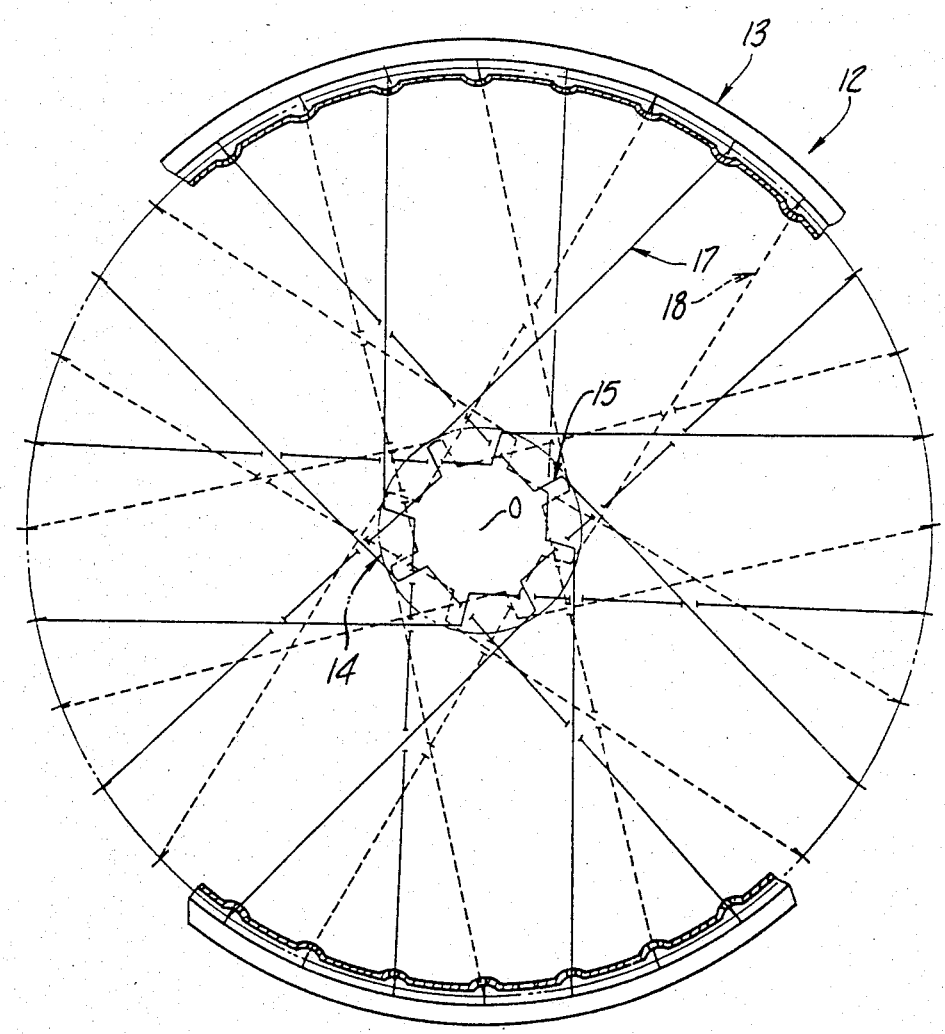
FIG. 2 is an enlarged side elevational view of one of the wheels, with portions broken away and other portions shown in section.

In FIG. 1, a motorcycle, which is adapted primarily for off the road use, is identified generally by the reference numeral 11. The motorcycle is equipped with front and rear wheels 12 which are constructed in accordance with the invention in a manner as best shown in the remaining figures.

The wheels 12 are comprised of an outer rim 13 which is preferably formed from a light weight material such as aluminum, aluminum alloy or other similar types of materials. The wheel 12 also includes a center hub 14 which may be formed of a like material and that has a pair of spaced apart flanges 15 and 16. The hub defines an axis of rotation for the wheel as indicated by the dot-dash line O.

The rim 13 is affixed to the hub 14 by first and second series of spokes 17 and 18 at respective opposite sides of the wheel 12. The spokes 17 are formed as single pieces having the first end thereof affixed to the rim 13 on one side by nipples 19 and the other end affixed to the rim 13 on the opposite side of the center O at a circumferentially spaced location from the first end by a like nipple 19. The nipples 19 intersect the rim 13 and are affixed to it at the points P that are offset a distance 1 from a center line CL that is in a plane perpendicular to the axis of rotation O and passing through the center of the rim 13. The spokes 18 are affixed, in a like manner, to the opposite side of the rim 13 and are carried by the hub flange 16.

The spokes 17 are all of the same configuration and include a first portion 21 that is affixed at one end, as aforenoted, by the nipples 19, to the rim 13. In addition, a second section 22 is affixed at one end to the rim 13 by the nipple 19 on the opposite side from the connection of the end of the first section 21, as aforenoted. The sections 21 and 22 are interconnected to be each other by an intermediate section 23. The intermediate section 23 is comprised of a straight portion 24 that is connected to the respective sections 21 and 22 by bent portions a and b, respectively.

In accordance with the invention, the intermediate sections 23 are retained in the hub flange 15 within specially formed recesses, indicated generally by the reference numeral 25. The recesses 25 have a generally L shape in side elevation consisting of a first short leg 25a tha extends radially inwardly from the outer periphery and which merges into a second section 25b that extends a longer direction. The sections 25c and 25b are joined by an arcuate section that is complementary in shape to the bent portion b of spokes 17. The section 25a is adapted to receive the straight portion 24 of the intermediate section 23 of the spokes. The portion 25b of the recess 25, however, receives the straight portion of the respective spoke section 21. As may be best seen in FIGS. 3 and 4, the configuration is such that the bent area a where the straight portion 24 of the intermediate section 23 joins the end section 22 is disposed radially outwardly from the point where the sections 25a and 25b join to receive the cureve section b of the spoke intermediate sections 23 and specifically where the straight portion 24 merges with the section 21. This point is disposed radially inwardly from the point a toward the center of rotation O.

It should be noted that the point a lies a greater distance in an axial direction from the center line plane CL than the point b. This is important in that it orients the spokes 17 so that they may be interconnected with the rim 13 on the same side of the center line plane as the flange 15 without interference and thus facilitates formation of the rim 13 on standard rim making equipment.

In side elevational view, the spoke lacing pattern is such that each spoke 17 intersects the next adjacent spoke at a point c, the following adjacent spoke at the point d and the third adjacent spoke at the point e. The configuration is such, as seen in FIG. 4, that the points c, d and e are disposed axially outwardly each with respect to the others. In addition, the spacing between the spokes at the point c in an axial direction is greater than the spacing at the point d and this spacing is greater than that at the point e, wherein the spokes are nearly adjacent to each other. Because of this configuration, it is possible to place all of the nipple points P at the distance L on the same side of the center line CL and thus a very simple yet highly effective lacing pattern is provided that will offer good strength and can be manufactured with existing equipment.

It should also be noted that the configuration of the grooves 25 is such that the point c on the long leg of one groove receiving groove 25 lies under the corresponding portion 25a of the next adjacent groove so as to achieve the spacing as described. The shorter groove 25a is shaped so that it is shallowest where the curved portion a is received and is deeper in an axial direction toward the point b.

The construction of the spokes 18 at the opposite side of the wheel and the corresponding recesses of the flange 16 are exactly the same as those of the spokes 17 and the corresponding recesses 25 of the flange 15 so that a single series of spokes may be used for both sides of the wheel. This further simplifies the construction and insures against accidental and incorrect assembly of one spoke on the wrong side of the rim.

It should be readily apparent from the foregoing description that the described construction provides a very simple, highly strong and yet easily manufactured wire wheel arrangement in which the spoke ends may be connected to the rim in a conventional manner and yet the spokes do not interfere with each other.

Although an embodiment of the invention has been illustrated and described, various changes and modifications may be made without departing from the spirit and scope of the invention, as defined by the appended claims.

I claim:

1. In a wire wheel comprising a hub defining an axis of rotation, a rim, and a plurality of spokes affixed to said rim and said hub for affixing said rim to said hub, said spokes having a first end affixed to said rim, a second end affixed to said rim at a point circumferentially spaced from the point of attachment of the first end to the rim and an intermediate portion having a crank shape in side elevation consisting of at least two bent sections connected by a straight section and affixed to said hub, the improvement comprising said hub being formed with a plurality of recesses each adapted to receive a respective spoke intermediate portion for fixing said spokes to said hub, said recesses being configured so that the straight section of the intermediate portion is inclined so that its radially inwardmost bent portion is positioned closer to a central plane perpendicular to said axis of rotation and passing through the center of said rim than the radially outermost bent portion.

2. In a wire wheel as set forth in claim 1 wherein the recesses have a generally L shape in side elevation.

3. In a wire wheel as set forth in claim 2 wherein the short leg of the L shape of the recess extends generally radially and receives the outermost bent portion of the spoke.

4. In a wire wheel as set forth in claim 2 wherein the long leg is tapered axially inwardly from its point of junction with the short leg to its opposite end.

5. In a wire wheel as set forth in claim 4 wherein the short leg is tapered axially inwardly from its outer end to the point where it joins the long leg.

6. In a wire wheel as set forth in claim 5 wherein the hub has a pair of axially spaced flanges and the spokes cooperate with recesses formed in the first of the flanges and further including a second series of spokes, identical in configuration to the first mentioned spokes, and extending between recesses formed in the other of said hub flanges to said rim.

7. In a wire wheel as set forth in claim 6 wherein each of the spokes intersects the next two adjacent spokes looking when viewed in plan and considered in a circumferential direction, the intersection with the first most adjacent spoke being spaced further in an axial direction than the intersection with the second adjacent spoke.

8. In a wire wheel comprising a hub defining an axis of rotation, a rim, and a plurality of spokes affixed to said rim and said hub for affixing said rim to said hub, said spokes having a first end affixed to said rim, a second end affixed to said rim at a point circumferentially spaced from the point of attachment of the first end to the rim and an intermediate portion having a crank shape in side elevation consisting of at least two bent sections connected by a straight section and affixed to said hub, the improvement comprising said hub being formed with a plurality of recesses each adapted to receive a respective spoke intermediate portion for fixing said spokes to said hub, said recesses being configured so that each spoke intersects the next adjacent two spokes considered in a circumferential direction and viewed in side elevation, the intersection with the first most adjacent spoke being spaced further in an axial direction than the intersection with the second adjacent spoke.

9. In a wire wheel as set forth in claim 8 wherein the recesses and spokes are configured so that each spoke intersects the next adjacent three spokes and the intersection with the third adjacent spoke is spaced closer in an axial direction than the intersection with the second adjacent spoke.

* * * * *